June 2, 1931.  J. E. SCHRODER  1,808,180
APPARATUS FOR HANDLING GLASSWARE
Filed Sept. 3, 1927
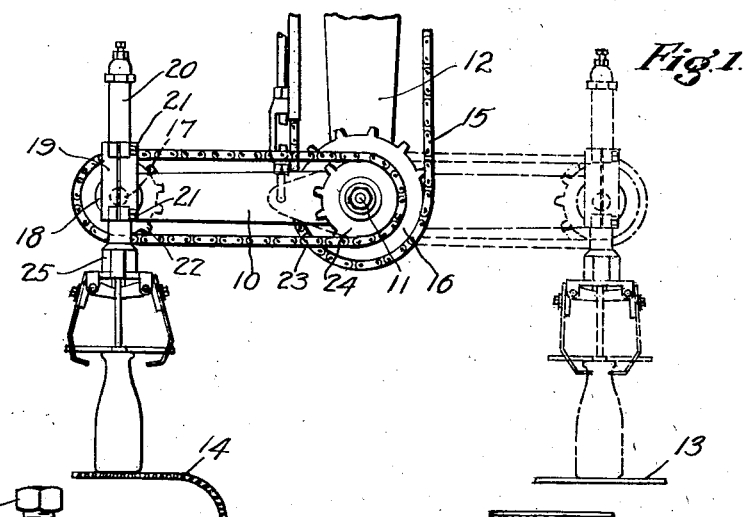
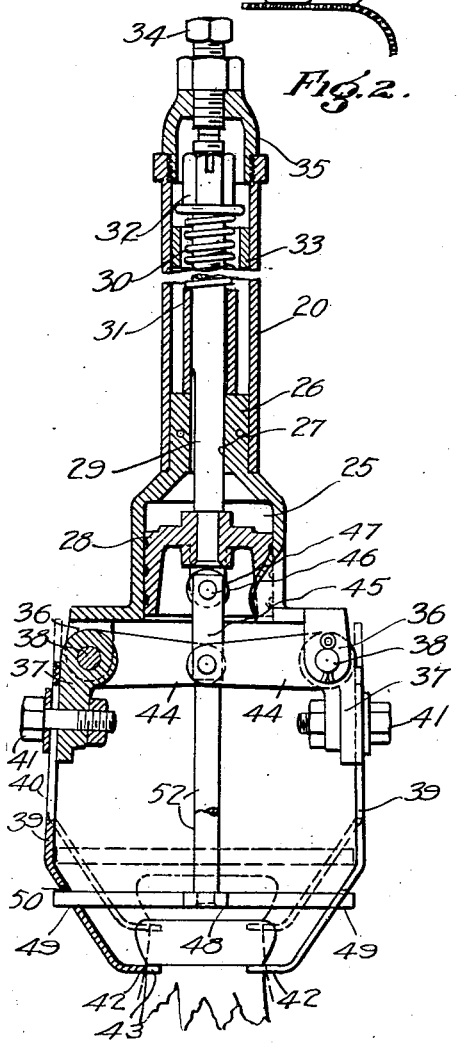
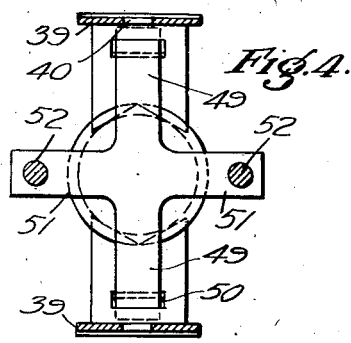
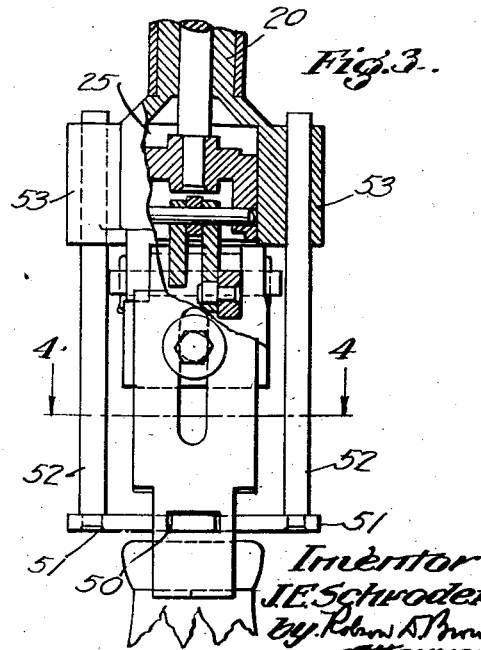
Inventor
J. E. Schroder
by Robert A. Brown
Attorney Patented June 2, 1931

1,808,180

UNITED STATES PATENT OFFICE

JOHN E. SCHRODER, OF HARTFORD, CONNECTICUT, ASSIGNOR TO HARTFORD-EMPIRE COMPANY, OF HARTFORD, CONNECTICUT, A CORPORATION OF DELAWARE

APPARATUS FOR HANDLING GLASSWARE

Application filed September 3, 1927. Serial No. 217,489.

The present invention relates to apparatus for handling articles of glassware and it has particular relation to devices for picking up bottles or other articles, at one place, and depositing them at another place. The invention is illustrated as incorporated in a stacker for placing articles of glassware in an annealing lehr. A stacking device to which this invention may be applied is disclosed in the application of Edward H. Lorenz, Serial No. 204,875. The invention may also be employed for transferring glassware or other articles from one position to another for other purposes, and is not necessarily limited to apparatus for placing the ware in a lehr. For instance, it might be employed in taking finished glassware out of the molds and depositing it on a buck.

One of the objects of the present invention is to provide a device of the character described, that is particularly adapted to automatically adjust itself while in operation to handle ware of varying heights such as may be produced by two or more separate and independent shaping machines or by a single machine having molds for fabricating ware of different heights, regardless of the order or sequence in which such ware arrives at the transfer station.

Other objects will appear from the following specification and the appended claims.

In the accompanying drawings:—

Fig. 1 is a side elevational view of a transferring device constructed in accordance with the present invention.

Fig. 2 is a view of the tongs mechanism on a larger scale, partly in side elevation and partly in vertical section.

Fig. 3 is a side elevational view of the tongs mechanism taken at right angles to Fig. 2 with parts broken away and parts in section, and Fig. 4 is a horizontal sectional view taken on line 4—4 of Fig. 3.

In general the device illustrated comprises ware-lifting fingers carried by a tongs head which is in turn carried by the outer end of an arm oscillating about a horizontal axis. A parallel motion device is provided by means of which the tongs head is maintained in a vertical position. The tongs head contains a spring which continually urges the tongs fingers to gripping position and has a provision for the inlet of fluid pressure to bear upon a piston for compressing the spring and moving the tongs fingers to non-gripping position.

In the present invention, the tong fingers are themselves mounted on slides which are adapted, when the fingers are out of their gripping position, (i. e. when the spring member is compressed), to slide freely and be lowered by the action of gravity or raised relative to the head by a stop member which is connected to the gripping fingers and is adapted to contact with the top of the ware. However, when the gripping members are in engagement with an article, the slide members bind upon their guides and up or down movement of the gripping fingers is prevented. Thus the tongs will be moved by gravity to their lowermost position after the delivery of each article, and then the stop member above described will automatically adjust the height of the gripping fingers to correspond with the height of the next article being engaged.

Referring to the drawings:

The apparatus is shown as comprising an arm 10 which is mounted for oscillation about a horizontal shaft 11 fixed in the lower extremity of a downwardly extending arm or bracket 12. The arm 10 is oscillated between a ware-receiving station and a ware-delivery station, in the present instance between a buck or conveyor 13 and a lehr conveyor 14, by means of a sprocket chain 15 which engages a sprocket wheel 16 fixed to the arm 10 and which is actuated alternately in opposite directions by any suitable mechanism not shown. A shaft 17 is rotatably mounted in a bearing 18 formed on the outer end of the arm 10 and is provided at one end with a split sleeve 19 in which a vertically extending barrel or tongs carrier 20 is adjustably clamped by means of bolts 21. A sprocket wheel 22 is fixed to the inner end of the shaft 17 and is engaged by an endless sprocket chain 23 which also passes around a similar sprocket wheel 24 which is fixed to the shaft 11, the shaft 11 being in turn fixed against rotation in the bracket 12. By means of this construction the tongs mechanism, which will now be described, is maintained vertical during the swinging movement of the transfer arm 10.

The barrel 20 carries a fluid pressure cylinder 25 at its lower end. This cylinder is formed with a reduced portion 26 which is secured within the lower end of the barrel 20, and which is formed with an axial bore 27 extending vertically therethrough. A piston 28 is mounted for vertical reciprocation within the cylinder 25 and is provided with a piston rod 29 which extends loosely through the bore 27 and upwardly through the barrel 20. The piston 28 is urged upwardly by coil spring 30 which encircles the rod 29 and which is interposed between a sleeve 31 surrounding the part of the rod 29 adjacent to the reduced portion 26 of the cylinder 25 and an adjusting nut 32 which is screwed onto the upper end of the rod 29. This nut is adapted to engage an annulus 33 which is secured within the barrel 20 in order to adjustably limit the downward movement of the piston 28 when air pressure is applied within the cylinder 25 by any suitable valve mechanism (not shown). The upward movement of the piston 28 is adjustably limited by means of a stop screw 34 which is threaded in the upper end of a cap 35 which is in turn threaded onto the upper end of the barrel 20. This stop screw is engaged by the upper end of the rod 29 under the action of the spring 30 when air pressure in the cylinder 25 is relieved and limits the closing movement of the tongs mechanism. The above described mechanism is disclosed in the application of Edward H. Lorenz mentioned above.

The lower flanged edge of the cylinder 25 is provided with two diametrically disposed pairs of depending ears 36, and between each pair a tongs holder 37 is pivotally mounted by means of a pivot pin 38. Each tongs holder is a bell crank lever and is described more particularly below. The tongs comprise a pair of slides 39, provided with vertically extending slots 40 for vertical sliding engagement with bolts 41 which maintain the slides 39 in position on the holders 37. Each of the slides 39 is formed with an inwardly projecting portion 42 provided with a notch 43 at its inner end for engagement around the neck of a bottle beneath the finish thereof. The tongs holders 37 are also provided with inwardly projecting arms 44 which are offset horizontally relative to each other and which are each pivotally connected to the lower end of one of a pair of links 45. The upper ends of the links 45 are pivotally connected to the piston 28 by means of a pin 46 and are maintained in spaced relation to each other by a spacing washer 47. By means of this construction, when air pressure is admitted to the cylinder 25 the piston 28 will be depressed, thus causing the tongs to open, whereas when the air pressure within the cylinder is relieved, the spring 30 will elevate the piston 28 and close the tongs about the ware (Fig. 2). It will thus be apparent that the tongs engage the ware with a predetermined spring pressure. As has been pointed out before, the upward movement of the piston 28, and hence the limit of the closing movement of the tongs, may be accurately adjusted according to the diameter of the neck of the ware by means of the adjusting stop screw 34, and the opening limit may be adjusted by the nut 32.

In order to arrest the movement of the tongs in alignment with the tongs-engaging portion of the ware, or just below the finish of the bottle as shown in the drawing, a stop or bottle engaging member 48 is provided. This member is carried by the slides 39 of the tongs and is preferably of cruciform construction having a pair of horizontally disposed oppositely extending arms 49, which project loosely through openings 50 in the slides 39, and also having a pair of transverse arms 51, to each of which is secured a vertical rod 52. The rods 52 extend upwardly and slidably engage bearings 53 which are preferably formed integrally with the fluid pressure cylinder 25. These rods maintain the stop 48 horizontal in all vertical positions, and maintain the ware-engaging fingers 42 of the tongs in alignment with each other at all times.

In operation, let it be assumed that the barrel or tongs carrier 20 has been adjusted in the split bearing 19, so that the tongs at their extreme limit of travel towards the receiving station will occupy a position to grasp a relatively short bottle, a pint milk bottle, for example. Also, let it be assumed that a relatively tall bottle, a quart milk bottle, for instance, has been conveyed to the receiving station for transfer to the lehr. In such case, the stop 48 will first engage the top of the tall bottle and will arrest the movement of the gripping jaws 42 of the tongs in a position just below the neck finish thereof. The arm 10, however, oscillates through an arc of 180°, and consequently continues its movement for a short time after the stop 48 engages the top of the bottle. This continued movement of the arm 10 causes the barrel 20 and the tongs holders 37 carried thereby to continue their downward movement, and the bolts 41 to slide downwardly in the slots 40 of the slides 39. At the conclusion of this swinging movement of the arm 10, air pressure in the cylinder 25 is released, allowing the tongs to close and engage the ware under the action of the spring 30, and the arm 10 is then swung toward the delivery station. During this transferring movement, the action of the spring 30 in maintaining the tongs in gripping engagement with the neck of the bottle causes the upper portions of the slides 39 to bind between the tongs holder 37 and the bolts 41, thus maintaining the tongs in their adjusted vertical position relative to the tongs carrier or barrel 20 until the bottle is released at the delivery station. As soon as air pressure is admitted to the cylinder 25 in order to force the tongs apart to release the ware and the arm 10 has been swung upwardly on its return movement to the buck, the tongs will descend to their original position under the action of gravity, so that in event that the next bottle to be transferred is of less height, the tongs will occupy a position to grip the same.

It will be apparent from the foregoing, that a very simple and efficient mechanism is provided whereby the height of the tongs is automatically adjusted to that of the ware being transferred while the device is in operation, and that ware varying in height between the limits of the lowermost and uppermost positions of the tongs may be transferred regardless of the order and sequence in which they are delivered to the receiving station by the buck.

It will be understood that the several necessary elements constituting the invention may be varied in proportion, arrangement and mode of operation without departing from the nature and scope of the invention as set forth in the appended claims.

I claim:

1. Apparatus for handling glassware comprising an arm mounted for movement between a ware-receiving station and a ware-delivery station, a holder and tongs actuating means carried by said arm, tongs members mounted for vertical sliding movement with respect to said actuating means, means carried by the tongs for engagement with the ware and adapted to adjust the height of said tongs relative to the tong-engaging portion of said ware, means for maintaining said ware-engaging means in a horizontal position whereby the ware-engaging portions of said tongs are maintained in horizontal alignment with each other, and said tongs being frictionally maintained in their adjusted position during the transferring operation.

2. Apparatus for handling glassware comprising a supporting member adapted to be moved between a ware-receiving station and a ware-delivery station, tongs actuating and carrying mechanism mounted on said member, tongs gripping members mounted for substantially vertical sliding movement with respect to said actuating mechanism, means engaging an article to be transferred to adjust automatically the position of said gripping members with respect to said actuating mechanism, and such adjustment being maintained during the time an article is being gripped and transferred and until said gripping members are opened depositing the article at the ware-delivery station.

3. Apparatus for handling glassware comprising a supporting member adapted to be moved between a ware-receiving station and a ware-delivery station, a tong carrying head mounted on said member, lever members on said head, tongs gripping members mounted on said levers for sliding movement in a substantially vertical direction, means for moving said levers for moving said tongs gripping members to open and closed positions, a stop member intermediate said gripping members and interconnected therewith for simultaneous vertical movement, and means to maintain said stop member substantially horizontal to retain said gripping members in proper vertical relation with one another, the last named means being arranged to permit the vertical movement of said stop member with respect to said head.

4. Apparatus for handling glassware comprising an arm mounted for movement between a ware receiving station and a ware delivering station, tongs mechanism carried by said arm comprising a plurality of slides mounted for individual vertical sliding movement relative to the remainder of said tongs mechanism, gripping means on one end of each of said slides, and means connected to the said last named means to adjust automatically the height of said gripping means simultaneously relative to the remainder of the tongs mechanism and to maintain said last named means in ware gripping position relative to one another.

5. Apparatus for handling glassware, comprising an arm mounted for movement between a ware-receiving station and a ware-delivery station, tongs carried by said arm, means to close and open the tongs to grip and release the ware, means engaging an article of ware to be transferred for moving said tongs relative to said arm to an extent determined by the height of the article, whereby the tongs are positioned to suit that article, and means effective only when the tongs are in article-gripping position for maintaining the tongs in the position to which they are moved relative to the arm during the movement of said arm toward said ware-delivery position.

6. Apparatus for handling glassware, comprising an arm mounted for movement between a ware-receiving station and a ware-delivery station, tongs carried by said arm, means to close and open the tongs to grip and release the ware, means engaging an article of ware to be transferred for moving said tongs relative to said arm to an extent determined by the height of the article, whereby the tongs are positioned to suit that article, and means effective when the tongs are in article-gripping position for maintaining the tongs in the position to which they are moved relative to the arm during the movement of said arm toward said ware-delivery position, said means being ineffective to maintain the tongs in such position after the tongs are opened.

Signed at Hartford, Conn., this 2nd day of September 1927.

JOHN E. SCHRODER.